US011225575B2

(12) United States Patent
Kumamoto

(10) Patent No.: US 11,225,575 B2
(45) Date of Patent: Jan. 18, 2022

(54) RUBBER COMPOSITION FOR INNER LINER, AND PNEUMATIC TIRE

(71) Applicant: Toyo Tire Corporation, Itami (JP)

(72) Inventor: Ryo Kumamoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 161 days.

(21) Appl. No.: 16/672,774

(22) Filed: Nov. 4, 2019

(65) Prior Publication Data

US 2020/0140688 A1    May 7, 2020

(30) Foreign Application Priority Data

Nov. 7, 2018 (JP) .............. JP2018-209496
Nov. 7, 2018 (JP) .............. JP2018-209545

(51) Int. Cl.
*C08L 83/06* (2006.01)
*C08K 3/013* (2018.01)
*B60C 1/00* (2006.01)
*C08K 5/01* (2006.01)
*C08K 3/04* (2006.01)

(52) U.S. Cl.
CPC .......... *C08L 83/06* (2013.01); *B60C 1/0008* (2013.01); *C08K 3/013* (2018.01); *C08K 3/04* (2013.01); *C08K 5/01* (2013.01)

(58) Field of Classification Search
CPC .......... C08L 83/06; C08K 3/013; C08K 3/04; C08K 5/01; B60C 1/0008
USPC .......................................... 524/495
See application file for complete search history.

(56) References Cited

U.S. PATENT DOCUMENTS

| | | | | |
|---|---|---|---|---|
| 4,942,187 A * | 7/1990 | Kawata | ............... | C08F 255/08 523/200 |
| 2015/0183914 A1* | 7/2015 | Kawai | ............... | B60C 1/0016 523/155 |
| 2015/0252133 A1* | 9/2015 | Morita | ............... | C08C 19/25 523/155 |
| 2017/0210885 A1* | 7/2017 | Xue | ............... | B60C 1/0016 |

FOREIGN PATENT DOCUMENTS

| | | |
|---|---|---|
| JP | 2009-24101 A | 2/2009 |
| JP | 2011-168666 A | 9/2011 |

* cited by examiner

*Primary Examiner* — William K Cheung
(74) *Attorney, Agent, or Firm* — Westerman, Hattori, Daniels & Adrian, LLP

(57) ABSTRACT

A rubber composition for an inner liner that has a carbon black and a modified silicone oil having a silanol group at a molecular terminal thereof can give a vulcanized rubber excellent in air permeability resistance and resistance to fatigue from flexing. This rubber composition can give a vulcanized rubber which can be restrained from being lowered in air permeability resistance and which is excellent in resistance to fatigue from flexing even when the rubber composition contains a process oil.

5 Claims, No Drawings

RUBBER COMPOSITION FOR INNER LINER, AND PNEUMATIC TIRE

BACKGROUND OF THE INVENTION

Field of the Invention

The present invention relates to a rubber composition for an inner liner, and a pneumatic tire.

Description of the Related Art

In a tubeless pneumatic tire, on its tire inner surface, a rubber layer is laid which is called an inner liner and which has a low air permeability (which has an air permeability resistance) to ensure the airtightness of the tire. In the inner liner, a butyl type rubber is usually used, which has a lower air permeability (which has a higher air permeability resistance) than a rubber of a rubber layer constituting, for example, a tread or a sidewall.

Furthermore, in order to improve an inner liner further in air permeability resistance, it is known that a flat-plate form filler is blended into a rubber composition for the inner liner. However, when the flat-plate form filler is blended thereinto, there is caused a problem that a vulcanized rubber yielded from the rubber composition is deteriorated in resistance to fatigue from flexing. For this reason, the rubber composition is required to be improved in air permeability resistance and resistance to fatigue from flexing with a good balance (Patent Document 1).

The following is also known: it is preferred, from the viewpoint of restraining a rubber composition for an inner liner from being deteriorated in air permeability resistance, not to blend, into this rubber composition, any softener such as a process oil, or any plasticizer such as a phthalic acid ester (Patent Document 2).

PRIOR ART DOCUMENTS

Patent Document

Patent Document 1: JP-A-2011-168666
Patent Document 2: JP-A-2009-24101

SUMMARY OF THE INVENTION

Rubber compositions for inner liner are required to be better in air permeability resistance and resistance to fatigue from flexing. However, about vulcanized rubbers yielded, respectively, from rubber compositions as described in the above-mentioned patent documents, there remains a room for improving these properties.

In the light of the above-mentioned actual situation, the present invention has been made. Thus, a first object thereof is to provide a rubber composition for an inner liner which can give a vulcanized rubber excellent in air permeability resistance and resistance to fatigue from flexing.

In the meantime, it is known that the above-mentioned butyl type rubber, which is contained in a rubber composition for an inner liner, is not good in workability such as rollability, extrudability or shapability. Thus, the rubber composition for an inner liner desirably makes use of a softener, such as a process oil as described above.

In light of this actual situation, the present invention has been made. Thus, a second object thereof is to provide a rubber composition for an inner liner which can give a vulcanized rubber that can be restrained from being lowered in air permeability resistance and that is excellent in resistance to fatigue from flexing even when this rubber composition contains a process oil.

The present invention relates to a rubber composition for an inner liner that includes a carbon black, and a modified silicone oil having a silanol group at a molecular terminal thereof.

The present invention also relates to a pneumatic tire yielded by using the above-defined rubber composition.

The present invention also relates to a rubber composition for an inner liner that includes a carbon black, a modified silicone oil having a silanol group at a molecular terminal thereof, and a process oil.

Details of the action mechanism of advantageous effects of the rubber composition for line liner according to the present invention are partially unclear; however, the mechanism is presumed as described below. However, the invention may not be interpreted with limitation to this action mechanism.

The rubber composition of the present invention for inner liner includes at least a carbon black and a modified silicone oil having a silanol group at a molecular terminal thereof. As stated in Patent Document 2 described above, it is usually not preferred to blend, into a rubber composition for an inner liner, any softener such as a process oil. However, in the rubber composition of the present invention for inner liner, the modified silicone oil having a silanol group at a molecular terminal thereof can react with hydroxyl groups or carboxyl groups of the surface of the carbon black in the rubber composition; thus, a vulcanized rubber yielded from this rubber composition contains the carbon black large in polarity (the carbon black which has reacted with the silicone oil). From this matter, it is presumed that nitrogen, oxygen or other atoms are not easily dissolved in the vulcanized rubber. As a result, the vulcanized rubber is excellent in air permeability resistance. Moreover, it is presumed that the modified silicone oil having a silanol group at a molecular terminal thereof reacts with the hydroxyl groups or carboxyl groups of the carbon black surface so that when the rubber composition is mixed, particles of the carbon black can be restrained from aggregating with each other. As a result, the vulcanized rubber is excellent in resistance to fatigue from flexing.

DETAILED DESCRIPTION OF THE PREFERRED EMBODIMENTS

<Rubber Composition>

The rubber composition of the present invention is a rubber composition for an inner liner that includes at least a carbon black and a modified silicone oil having a silanol group at a molecular terminal thereof.

<Carbon Black>

The carbon black in the present invention is any carbon black used in an ordinary rubbery industry, such as SAF, ISAF, HAF, FEF, or GPF. The carbon black may also be an electroconductive carbon black such as acetylene black or Ketchen black. The carbon black may be any granulated carbon black, which has been granulated, considering the handleability of the carbon black in an ordinary rubbery industry; or a non-granulated carbon black. Such carbon blacks may be used singly or in any combination of two or more thereof.

About the carbon black, from the viewpoint of an improvement of the resultant vulcanized rubber in tackiness, the iodine adsorption is preferably 5 mg/g or more, more preferably 15 mg/g or more, and is preferably 150 mg/g or less, more preferably 100 mg/g or less, even more preferably 55 mg/g or less. About the carbon black, the DBP (dibutyl phthalate) oil absorption thereof is preferably 40 cm$^3$/100-g or more, more preferably 75 cm$^3$/100-g or more, and is preferably 150 cm$^3$/100-g or less, more preferably 125 cm$^3$/100-g or less. The iodine adsorption is a value measured in accordance with JIS K6217-1, and the DBP oil absorption is a value measured in accordance with JIS K6217-4.

From the viewpoint of an improvement of the vulcanized rubber in reinforceability, the amount of the carbon black is preferably 20 parts or more, more preferably 30 parts or more, even more preferably 40 parts or more by weight for 100 parts by weight of a rubber component in the rubber composition. From the viewpoint of a restraint of the rubber composition from increasing in viscosity, the amount is preferably 100 parts or less, more preferably 70 parts or less, even more preferably 60 parts or less by weight therefor.

<Modified Silicone Oil Having Silanol Group at Molecular Terminal Thereof>

The modified silicone oil having a silanol group at a molecular terminal thereof in the present invention is an organopolysiloxane compound in which one or more silanol groups are introduced into a side chain and/or a terminal of a silicone oil. The silanol group(s) may be present at both terminals of the molecule, or may be present at a single terminal thereof. In order to improve the vulcanized rubber in air permeability resistance and resistance to fatigue from flexing, the modified silicone oil is preferably a modified silicone oil having silanol groups at both molecular terminals thereof. The modified silicone oil having a silanol group at a molecular terminal thereof is preferably an organopolysiloxane compound having a main skeleton having a polydimethylsiloxane from the viewpoint of an easy availability thereof.

About the modified silicone oil having a silanol group at a molecular terminal thereof, the viscosity thereof at 25° C. is preferably 100,000 mm$^2$/s or less, more preferably 10,000 mm$^2$/s or less, even more preferably 5,000 mm$^2$/s or less, even more preferably 1,000 mm$^2$/s or more, even more preferably 500 mm$^2$/s or less, most preferably 100 mm$^2$/s or less.

Examples of a commercially available product of the modified silicone oil having a silanol group at a molecular terminal thereof include products having respective trade names "X-21-5841" and "KF-9701" each manufactured by Shin-Etsu Chemical Co., Ltd.; products having respective trade names "YF3800", "XF3905", "YF3057", "YF3807", "YF3802", "YF3897", and "XC96-723" each manufactured by Momentive Performance Materials Inc.; and products having respective trade names "DMS-S12", "DMS-S14", "DMS-S15", "DMS-S21", "DMS-S27", "DMS-S31", "DMS-S32", "DMS-S33", "DMS-S35", "DMS-S42", "DMS-S45", and "DMS-S51" each manufactured by Gelest, Inc.

The amount of the modified silicone oil having a silanol group at a molecular terminal thereof is preferably 0.1 parts or more, more preferably 0.5 parts or more, even more preferably 1 part or more by weight for 100 parts by weight of the rubber component in the rubber composition to improve the vulcanized rubber in resistance to fatigue from flexing. The amount is preferably 10 parts or less, more preferably 8 parts or less, even more preferably 6 parts or less by weight therefor to improve the vulcanized rubber in air permeability resistance.

<Process Oil>

The rubber composition of the present invention may contain a process oil to improve the vulcanized rubber in resistance to fatigue from flexing, or to be improved in workability. Examples of the process oil include paraffin type process oils, naphthene type process oils, and aromatic process oils. The paraffin type process oils, naphthene type process oils, and aromatic process oils are each a high-boiling-point petroleum fraction. The process oil is generally classified into a paraffin type process oil, which is a linear saturated hydrocarbon, a naphthene type process oil, which is a cyclic saturated hydrocarbon, or an aroma type process oil, which is an aromatic hydrocarbon in accordance with the chemical structure of the hydrocarbon. The process oil may be a process oil having a low content of polycyclic aromatic compounds (PCAs) (low PCA content process oil) for environment countermeasures. Examples of the low PCA content process oil include treated distillate aromatic extracts (TDAEs), which are each yielded by re-extracting an oil aromatic type process oil; aroma alternative oils, which are each a mixed oil composed of asphalt and naphthene oil; mild extraction solvates (MESes); and heavy naphthene type oils. Out of these oils, preferred are paraffin type process oils, naphthene type process oils, and aromatic process oils. Such process oils may be used singly or in any combination of two or more thereof.

The amount of the process oil(s) is preferably 0.5 parts or more, more preferably 1 part or more, even more preferably 1.5 parts or more by weight for 100 parts by weight of the rubber component in the rubber composition to improve the vulcanized rubber in resistance to fatigue from flexing or improve the rubber composition in workability. The amount is preferably 5 parts or less, more preferably 4.5 parts or less, even more preferably 4 parts or less by weight therefor to improve the vulcanized rubber in air permeability resistance.

In order to attain a good balance between the air permeability resistance of the vulcanized rubber and the resistance of this rubber to fatigue from flexing, the total amount of modified silicone oil having a silanol group at a molecular terminal thereof and the process oil is preferably 1 part or more, more preferably 3 parts or more, even more preferably 5 parts or more by weight for 100 parts by weight of the rubber component in the rubber composition, and is preferably 10 parts or less, more preferably 8 parts or less, even more preferably 6 parts or less by weight therefor.

The ratio by weight of the modified silicone oil having a silanol group at a molecular terminal thereof to the process oil ("the modified silicone oil having a silanol group at a molecular terminal thereof"/"the process oil") is preferably 0.1 or more, more preferably 0.2 or more, even more preferably 0.5 or more, and is preferably 4 or less, more preferably 3 or less, even more preferably 2.5 or less to attain a good balance between the air permeability resistance of the vulcanized rubber and the resistance of this rubber to fatigue from flexing.

In the present invention, the rubber composition for an inner liner may be prepared by using at least the above-mentioned carbon black and the above-mentioned modified silicone oil having a silanol group at a molecular terminal thereof. Additional raw materials of the rubber composition for an inner liner are, besides the above-mentioned process oil, a rubber, a flat-plate form filler, a tackifier, and various blending agents that are ordinarily used in the rubber industry.

<Rubber>

The rubber is preferably a butyl type rubber to improve the vulcanized rubber in air permeability resistance. Examples of the butyl type rubber include brominated butyl rubber, chlorinated butyl rubber, and other halogenated butyl rubber; and butyl rubber. Such butyl type rubbers may be used singly or in any combination of two or more thereof.

The butyl type rubber is preferably one or more of the halogenated butyl type rubbers to improve the vulcanized rubber in air permeability resistance. The proportion of the halogenated butyl type rubber(s) is 60% or more by weight of the butyl type rubber component(s) in the rubber composition.

Usable examples of the rubber include, besides the butyl type rubbers, natural rubber (NR), isoprene rubber (IR), styrene-butadiene rubber (SBR), butadiene rubber (BR), chloroprene rubber (CR), nitrile rubber (NBR), and other synthetic diene rubbers. These synthetic diene rubbers may each be a modified diene rubber into which the following is introduced: an amino, alkoxysilane, hydroxyl, epoxy, carboxyl, or cyano group; or a halogen. Such diene rubbers and modified diene rubbers may be used singly or in any combination of two or more thereof.

In the case of using, as the plural rubbers, the butyl type rubber and any one of the synthetic diene rubbers together, the amount of the butyl type rubber is preferably 60% by weight or more, more preferably 80% by weight or more, even more preferably 90% by weight or more of the rubber component(s) in the rubber composition to improve the vulcanized rubber in air permeability resistance.

<Flat-Plate Form Filler>

The flat-plate form filler is a filler having a main shape which is in a flat-plate form, and can hinder the permeation of air in the resultant rubber layer to improve the inner liner in air permeability resistance. In other words, usually, the inner liner, which is made of a thin rubber layer, has been shaped by using, for example, a roller or an extruder to extrude the rubber composition into a sheet form; thus, the flat-plate form filler is arranged in the state that flat particles thereof are laid down in the rubber layer to be substantially parallel with the front surface of this layer. Thus, about air that is to pass through the rubber layer in the thickness direction thereof, the passage thereof is interrupted by the flat-plate form filler. Consequently, the air passage is hindered.

Examples of the flat-plate form filler include inorganic fillers, such as talc, mica, clay and other lamellar minerals; and organic fillers, such as a coal pulverized product. The coal pulverized product is made of flat-plate form particles yielded by using a pulverizer, such as a ball mill, to pulverize coal finely. The flat-plate form filler is preferably the coal pulverized product since the product is good in compatibility with the rubber component(s) to be excellent in dispersibility in the rubber component(s).

The average particle diameter of the flat-plate form filler is preferably from about 0.5 to 100 μm, more preferably from about 1 to 30 μm, this diameter being measured by the laser diffraction scattering method.

The amount of the flat-plate form filler is preferably 5 parts or more, more preferably 8 parts or more by weight for 100 parts by weight of the rubber component(s) in the rubber composition to improve the vulcanized rubber in air permeability resistance. The amount is preferably 40 parts or less, more preferably 30 parts or less, even more preferably 20 parts or less by weight therefor to improve the vulcanized rubber in resistance to fatigue from flexing.

<Tackifier>

The tackifier is an additive for giving tackiness to the rubber composition. The blending of the tackifier into the rubber composition can heighten the adhesiveness between joined moieties of the inner liner during a period from the shaping of a green tire yielded from the rubber composition to the vulcanization thereof, so as to restrain the joined moieties from being separated from each other; and further the blending can also improve the inner liner in adhesiveness to a carcass ply.

Examples of the tackifier include alkylphenolic resins, and hydrocarbon resins. The tackifier is preferably any hydrocarbon resin to improve the vulcanized rubber in air permeability resistance.

The hydrocarbon resin is, for example, an aliphatic petroleum resin, an aromatic petroleum resin, or an aliphatic/aromatic petroleum resin. The aliphatic petroleum resin is a resin yielded by polymerizing cationically an unsaturated monomer, such as isoprene or cyclopentadiene, which is a petroleum fraction corresponding to 4 or 5 carbon atoms (C5 fraction) (the resin may be called a C5 type petroleum resin). This resin may be hydrogenated. The aromatic petroleum resin is a resin yielded by polymerizing cationically a monomer, such as vinyltoluene, an alkylstyrene or indene, which is a petroleum fraction corresponding to 8 or 10 carbon atoms (C9 fraction) (the resin may be called a C9 type petroleum resin). This resin may be hydrogenated. The aliphatic/aromatic petroleum resin is a resin yielded by copolymerizing a C5 fraction with a C9 fraction (the resin may be called a C5/C9 type petroleum resin). This resin may be hydrogenated. The hydrocarbon resin is preferably a petroleum resin made mainly of a C5 fraction.

The amount of the tackifier is 1 part or more, more preferably 2 parts or more by weight for 100 parts by weight of the rubber component(s) in the rubber composition, and is preferably 15 parts or less, more preferably 10 parts or less by weight therefor.

Examples of the various blending agents include a sulfur-based vulcanizer, a vulcanization promoter, an antiaging agent, silica, a silane coupling agent, zinc oxide, a methylene receptor and a methylene donor, an organic acid cobalt salt, stearic acid, a vulcanization promotion aid, a vulcanization retarder, an organic peroxide, softeners such as wax and oil, and a processing aid.

The vulcanizer may be an ordinary vulcanizer for rubbers, and is preferably a sulfur-based vulcanizer. The species of sulfur for the sulfur-based vulcanizer may be any ordinary sulfur species for rubbers. Examples of the species include powdery sulfur, precipitated sulfur, insoluble sulfur, and highly dispersed sulfur. Such vulcanizers may be used singly or in any combination of two or more thereof.

The vulcanizer content is preferably from 0.05 to 2 parts, more preferably from 0.1 to 1 part by weight for 100 parts by weight of the rubber component(s) in the rubber composition.

The vulcanization promoter may be any ordinary vulcanization promoter for rubbers. Examples thereof include sulfenamide based, thiuram based, thiazole based, thiourea based, guanidine based and dithiocarbamic acid salt based vulcanization promoters. Such vulcanization promoters may be used singly or in any combination of two or more thereof.

The vulcanization promoter content is preferably from 0.5 to 5 parts, more preferably from 1 to 3 parts by weight for 100 parts by weight of the rubber component in the rubber composition.

The method for blending (or adding) the carbon black, the modified silicone oil having a silanol group at a molecular terminal thereof, the process oil, the rubber, the flat-plate form filler, the tackifier and the various blending agents, which are as described above, into each other is, for example, a method of kneading these components using a kneading machine used in an ordinary rubber industry, such as a Banbury mixer, a kneader, or a roll.

The kneading method is not particularly limited, and is, for example, a method of adding components other than vulcanization-related components, such a sulfur based vulcanizer and a vulcanization promoter, to each other in any order; of adding these components to each other simultaneously, so as to knead these components; or of adding all the components to each other simultaneously to knead the components. The number of times of the kneading may be one or plural. The period for the kneading is varied in accordance with the size of the kneading machine to be used, and other factors. It is advisable to set the period usually into the range of about 2 to 5 minutes. The composition-discharging-temperature in the kneading machine is set to a range preferably from 100 to 170° C., more preferably from 110 to 160° C. When the rubber composition includes one or more of the vulcanization-related components, the discharging-temperature in the kneading machine is set to a range preferably from 80 to 110° C., more preferably from 80 to 100° C.

The method for shaping the rubber composition into an inner liner may be a method of using, for example, a roll or an extruder to extrude the composition into a sheet form in a usual way, causing the extruded sheet-form product to adhere onto the inside of a rubber constituting, for example, a tread or a sidewall, and then vulcanizing/shaping the resultant. Such a shaping method can form a tubeless pneumatic tire having, on a tire inner surface thereof, an inner liner made of a thin rubber layer. The thickness of the inner liner is varied in accordance with the size of the tire, and others. The thickness is usually from 0.5 to 3 mm.

The use of the rubber composition of the present invention for inner liner is not particularly limited. The rubber composition is suitable for pneumatic tires for a heavy load, such as a truck or a bus, which is required to have a high air permeability resistance.

EXAMPLES

Hereinafter, the present invention will be described by way of working examples thereof. However, the invention is never limited by these working examples.

Hereinafter, embodiments related to the first object will be described.

(Used Raw Materials)

a) Brominated butyl rubber: "BROMOBUTYL 2222" (manufactured by Japan Butyl Co., Ltd.);

b) Carbon black: "SEAST V (GPF)" (manufactured by Tokai Carbon Co., Ltd.);

c) Coal pulverized product: pulverized product of bituminous coal, "AUSTIN BLACK 325" (manufactured by Coal Fillers, Inc.) (average particle diameter: 5 μm);

d) Tackifier: "T-REZ RA100" (manufactured by Tonen Chemical Corp.);

e) Oil (A): modified silicone oil having, at both terminals thereof, silanol groups, "X-21-5841" (manufactured by Shin-Etsu Chemical Co., Ltd.) (viscosity at 25° C.: 30 mm$^2$/s);

f) Oil (B): modified silicone oil having, at both terminals thereof, silanol groups, "YF3802" (manufactured by Momentive Performance Materials Inc.) (viscosity at 25° C.: 80,000 mm$^2$/s);

g) Oil (C): "PROCESS NC1-40" (manufactured by JXTG Nippon Oil & Energy Corp.);

h) Zinc oxide: "Zinc Oxide, Species 3" (manufactured by Mitsui Mining & Smelting Co., Ltd.);

i) Stearic acid: "Palmac 1500 Beads" (manufactured by a company IOI Acidchem Sdn Bhd);

j) Vulcanization promoter: "NOCCELLAR DM-P" (manufactured by Ouchi Shinko Chemical Industrial Co., Ltd.); and k) Sulfur: "5%-OIL-INCORPORATED FINELY-POWDERY SULFUR" (manufactured by Tsurumi Chemical Industry Co., Ltd.); and Examples 1 to 3, and Comparative Examples 1 and 2

<Production of Rubber Compositions and Unvulcanized Rubber Compositions>

In each of the examples, a Banbury mixer was used to dry-mix individual raw materials (i.e., components other than any sulfur and any vulcanization promoter) shown in Table 1 (kneading period: 3 minutes; composition-discharging-temperature: 120° C.). In this way, a rubber composition was produced. Next, to the resultant rubber composition were added a sulfur and a vulcanization promoter that are shown in Table 1, and then the Banbury mixer was used to dry-mix all the components (kneading period: 1 minute; composition-discharging-temperature: 90° C.). In this way, an unvulcanized rubber composition was produced. The blend proportion of any component in Table 1 is represented by the numerical value of the part(s) by weight (phr) of this component when the amount of the rubber component contained in the corresponding rubber composition is regarded as 100 parts by weight.

<Vulcanized Rubber Production>

The unvulcanized rubber composition yielded in each of the working examples and the comparative examples was vulcanized at 160° C. for 30 minutes to produce a vulcanized rubber. The resultant vulcanized rubber was evaluated as described below. The evaluation results are shown in Table 1.

<Evaluation of Air Permeability Resistance>

About the evaluation of the air permeability resistance of the vulcanized rubber, a gas permeability tester ("BT-3", manufactured by Toyo Seiki Seisaku-sho, Ltd.) was used to measure the air permeability percentage of a sheet of the vulcanized rubber that had a thickness of 1 mm. The result was represented as an index relative to the value of that in Comparative Example 1, which was regarded as 100. It is demonstrated that as the numerical value thereof is larger, the air permeability resistance is better.

<Evaluation of Resistance to Fatigue from Flexing>

About the evaluation of the resistance of the vulcanized rubber to fatigue from flexing, in accordance with the evaluation of resistance to fatigue from flexing in JIS K 6260 (De Mattia flex cracking test), the number of times of the flexing of a test piece of the vulcanized rubber was gained until a crack growth therein turned to a length of 2 mm. The result was represented as an index relative to the value of that in Comparative Example 1, which was regarded as 100. It is demonstrated that as the numerical value thereof is larger, the resistance to the fatigue is better.

TABLE 1

|  | Comparative Example 1 | Comparative Example 2 | Example 1 | Example 2 | Example 3 |
| --- | --- | --- | --- | --- | --- |
| Brominated butyl rubber | 100 | 100 | 100 | 100 | 100 |
| Carbon black | 50 | 50 | 50 | 50 | 50 |
| Coal pulverized product | 10 | 10 | 10 | 10 | 10 |

TABLE 1-continued

|  | Comparative Example 1 | Comparative Example 2 | Example 1 | Example 2 | Example 3 |
|---|---|---|---|---|---|
| Tackifier | 3 | 3 | 3 | 3 | 3 |
| Oil (A) |  |  |  | 1 | 5 |
| Oil (B) |  |  |  |  | 5 |
| Oil (C) | 5 | 20 |  |  |  |
| Zinc oxide | 3 | 3 | 3 | 3 | 3 |
| Stearic acid | 1 | 1 | 1 | 1 | 1 |
| Vulcanization promoter | 2 | 2 | 2 | 2 | 2 |
| Sulfur | 0.5 | 0.5 | 0.5 | 0.5 | 0.5 |
| Air permeability resistance | 100 | 61 | 140 | 115 | 110 |
| Resistance to fatigue from flexing | 100 | 130 | 105 | 125 | 106 |

Hereinafter, embodiments related to the second object will be described.

(Used Raw Materials)

a) Brominated butyl rubber: "BROMOBUTYL 2222" (manufactured by Japan Butyl Co., Ltd.);

b) Carbon black: "SEAST V (GPF)" (manufactured by Tokai Carbon Co., Ltd.);

c) Coal pulverized product: pulverized product of bituminous coal, "AUSTIN BLACK 325" (manufactured by Coal Fillers, Inc.) (average particle diameter: 5 μm);

d) Tackifier: "T-REZ RA100" (manufactured by Tonen Chemical Corp.);

e) Oil (A): modified silicone oil having, at both terminals thereof, silanol groups, "X-21-5841" (manufactured by Shin-Etsu Chemical Co., Ltd.) (viscosity at 25° C.: 30 mm$^2$/s);

f) Oil (B): modified silicone oil having, at both terminals thereof, silanol groups, "YF3802" (manufactured by Momentive Performance Materials Inc.) (viscosity at 25° C.: 80,000 mm$^2$/s);

g) Oil (C): "PROCESS NC-140" (manufactured by JXTG Nippon Oil & Energy Corp.);

h) Oil (D): "JOMO PROCESS P-200" (manufactured by JXTG Nippon Oil & Energy Corp.);

i) Zinc oxide: "Zinc Oxide, Species 3" (manufactured by Mitsui Mining & Smelting Co., Ltd.);

j) Stearic acid: "Palmac 1500 Beads" (manufactured by a company IOI Acidchem Sdn Bhd);

k) Vulcanization promoter: "NOCCELLAR DM-P" (manufactured by Ouchi Shinko Chemical Industrial Co., Ltd.); and l) Sulfur: "5%-OIL-INCORPORATED FINELY-POWDERY SULFUR" (manufactured by Tsurumi Chemical Industry Co., Ltd.).

Examples 4 to 10, and Comparative Examples 3 and 4

<Production of Rubber Compositions and Unvulcanized Rubber Compositions>

In each of the examples, a Banbury mixer was used to dry-mix individual raw materials (i.e., components other than any sulfur and any vulcanization promoter) shown in Table 2 (kneading period: 3 minutes; composition-discharging-temperature: 120° C.). In this way, a rubber composition was produced. Next, to the resultant rubber composition were added a sulfur and a vulcanization promoter that are shown in Table 2, and then the Banbury mixer was used to dry-mix all the components (kneading period: 1 minute; composition-discharging-temperature: 90° C.). In this way, an unvulcanized rubber composition was produced. The blend proportion of any component in Table 2 is represented by the numerical value of the part(s) by weight (phr) of this component when the amount of the rubber component contained in the corresponding rubber composition is regarded as 100 parts by weight.

<Vulcanized Rubber Production>

The unvulcanized rubber composition yielded in each of the working examples and the comparative examples was vulcanized at 160° C. for 30 minutes to produce a vulcanized rubber. The resultant vulcanized rubber was evaluated as described below. The evaluation results are shown in Table 2.

<Evaluation of Air Permeability Resistance>

About the evaluation of the air permeability resistance of the vulcanized rubber, a gas permeability tester ("BT-3", manufactured by Toyo Seiki Seisaku-sho, Ltd.) was used to measure the air permeability percentage of a sheet of the vulcanized rubber that had a thickness of 1 mm. The result was represented as an index relative to the value of that in Comparative Example 3, which was regarded as 100. It is demonstrated that as the numerical value thereof is larger, the air permeability resistance is better.

<Evaluation of Resistance to Fatigue from Flexing>

About the evaluation of the resistance of the vulcanized rubber to fatigue from flexing, in accordance with the evaluation of resistance to fatigue from flexing in JIS K6260 (De Mattia flex cracking test), the number of times of the flexing of a test piece of the vulcanized rubber was gained until a crack growth therein turned to a length of 2 mm. The result was represented as an index relative to the value of that in Comparative Example 3, which was regarded as 100. It is demonstrated that as the numerical value thereof is larger, the resistance to the fatigue is better.

TABLE 2

|  | Comparative Example 3 | Comparative Example 4 | Example 4 | Example 5 | Example 6 | Example 7 | Example 8 | Example 9 | Example 10 |
|---|---|---|---|---|---|---|---|---|---|
| Brominated butyl rubber | 100 | 100 | 100 | 100 | 100 | 100 | 100 | 100 | 100 |
| Carbon black | 50 | 50 | 50 | 50 | 50 | 50 | 50 | 50 | 50 |
| Coal pulverized product | 10 | 10 | 10 | 10 | 10 | 10 | 10 | 10 | 10 |
| Tackifier | 3 | 3 | 3 | 3 | 3 | 3 | 3 | 3 | 3 |
| Oil (A) |  |  |  | 2.5 | 3 | 1 | 2 | 3 | 4 |
| Oil (B) |  |  |  |  |  |  |  |  | 4 |
| Oil (C) | 5 |  |  |  |  |  |  |  |  |
| Oil (D) |  | 5 | 2.5 | 3 | 4 | 3 | 2 | 2 | 2 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Vulcanization promoter | 2 | 2 | 2 | 2 | 2 | 2 | 2 | 2 | 2 |

TABLE 2-continued

|  | Comparative Example 3 | Comparative Example 4 | Example 4 | Example 5 | Example 6 | Example 7 | Example 8 | Example 9 | Example 10 |
|---|---|---|---|---|---|---|---|---|---|
| Sulfur | 0.5 | 0.5 | 0.5 | 0.5 | 0.5 | 0.5 | 0.5 | 0.5 | 0.5 |
| Air permeability resistance | 100 | 90 | 100 | 98 | 95 | 99 | 102 | 105 | 103 |
| Resistance to fatigue from flexing | 100 | 120 | 125 | 130 | 123 | 126 | 128 | 135 | 130 |

What is claimed is:

1. A rubber composition for an inner liner, comprising a carbon black, a modified silicone oil having a silanol group at a molecular terminal thereof, and a process oil, wherein an amount of the process oil is from 0.5 to 5 parts by weight for 100 parts by weight of the rubber component in the rubber composition.

2. The rubber composition for an inner liner according to claim 1, wherein an amount of the modified silicone oil having a silanol group at a molecular terminal thereof is from 0.1 to 10 parts by weight for 100 parts by weight of a rubber component in the rubber composition.

3. The rubber composition for an inner liner according to claim 1, wherein a total amount of the modified silicone oil having a silanol group at a molecular terminal thereof and the process oil is from 1 to 10 parts by weight for 100 parts by weight of a rubber component in the rubber composition.

4. The rubber composition for an inner liner according to claim 1, wherein a ratio by weight of the modified silicone oil having a silanol group at a molecular terminal thereof to the process oil ("the modified silicone oil having a silanol group at a molecular terminal thereof"/" the process oil") is from 0.1 to 4 both inclusive.

5. A pneumatic tire, comprising an inner liner using the rubber composition according to claim 1.

* * * * *